(12) United States Patent
Frame

(10) Patent No.: US 9,668,428 B1
(45) Date of Patent: Jun. 6, 2017

(54) SECTIONAL DETACHABLE FLOWER POTS

(71) Applicant: Pam Frame, Fleming Island, FL (US)

(72) Inventor: Pam Frame, Fleming Island, FL (US)

(*) Notice: Subject to any disclaimer, the term of this patent is extended or adjusted under 35 U.S.C. 154(b) by 250 days.

(21) Appl. No.: 13/866,168

(22) Filed: Apr. 19, 2013

(51) Int. Cl.
*A01G 9/02* (2006.01)
*A01G 9/00* (2006.01)

(52) U.S. Cl.
CPC ............... *A01G 9/02* (2013.01); *A01G 9/028* (2013.01); *A01G 2009/003* (2013.01)

(58) Field of Classification Search
CPC .......... A01G 9/02; A01G 9/022; A01G 9/028; A01G 9/10; A01G 2009/003
USPC ......................... 47/66.1, 66.2, 66.3, 66.4, 79
See application file for complete search history.

(56) References Cited

U.S. PATENT DOCUMENTS

| | | | | |
|---|---|---|---|---|
| 195,094 | A * | 9/1877 | Crowther | 47/79 |
| 437,565 | A | 9/1890 | Byrne | |
| 579,295 | A | 3/1897 | Delzell | |
| 584,433 | A | 6/1897 | Walker | |
| 610,156 | A * | 8/1898 | Mechwart et al. | 47/73 |
| 805,491 | A | 7/1905 | Sedlacek | |
| 802,171 | A | 10/1905 | McQuery | |
| 1,499,473 | A * | 7/1924 | Price | 47/67 |
| 1,776,375 | A | 8/1929 | Russell | |
| 2,594,307 | A * | 4/1952 | Valenzuela | 47/73 |
| 2,651,884 | A * | 9/1953 | Werner | 47/80 |
| 3,065,570 | A * | 11/1962 | Fukuhara | 47/73 |
| 3,137,096 | A * | 6/1964 | Hopkins | 47/79 |
| 3,783,555 | A * | 1/1974 | Peters | 47/79 |
| 4,189,867 | A * | 2/1980 | Schneck | 47/62 R |
| 4,216,622 | A * | 8/1980 | Hollenbach et al. | 47/71 |
| 4,435,918 | A | 3/1984 | Shain | |
| 4,446,652 | A * | 5/1984 | Anderson | 47/79 |
| 4,847,741 | A * | 7/1989 | Boettinger | 362/431 |
| 4,991,345 | A * | 2/1991 | Bloch | 47/79 |
| D348,633 | S | 7/1994 | Emalfarb et al. | |
| D368,234 | S | 3/1996 | Dickinson et al. | |
| 5,535,549 | A | 7/1996 | Weder et al. | |
| 5,870,855 | A * | 2/1999 | Hougaard | 47/65.5 |
| 5,960,587 | A * | 10/1999 | Brasseur et al. | 47/86 |
| 5,991,999 | A | 11/1999 | Weder | |
| 6,050,529 | A | 4/2000 | Lin | |
| 6,161,333 | A * | 12/2000 | Poston | 47/86 |
| D445,358 | S * | 7/2001 | Simmons | D11/152 |
| 6,964,129 | B2 * | 11/2005 | Fenwick | 47/66.1 |
| 7,155,860 | B1 * | 1/2007 | Ferguson, III | 47/66.6 |
| 7,428,798 | B2 * | 9/2008 | Abney, II | 47/73 |
| 8,065,834 | B2 * | 11/2011 | Eckert | 47/66.1 |

* cited by examiner

*Primary Examiner* — David Parsley
(74) *Attorney, Agent, or Firm* — Lawrence J. Gibney; Mitchell R. Ghaneie

(57) ABSTRACT

In an effort to spruce up or add to the curb appeal of a home or business, a flower pot that is comprised in two sections and is detached can be placed around a column of the home. From the curb the passer-by would notice a plant around a column and not realize that the soil and plants are slightly elevated above the ground level to prevent water from directly draining on the wooden post or around any of the home structures where the pooling of water would be undesirable.

5 Claims, 6 Drawing Sheets

SECTIONAL DETACHABLE FLOWER POTS

BACKGROUND OF THE INVENTION

A. Field of the Invention

This device is a flower pot that will surround a column or post. The flower pot will come in two sections that are detachable. Many different shapes of flower pots are contemplated including circular, square or rectangular to name a few. This device is a way to allow a homeowner or business owner to add a decorative touch to an existing column or post. This would add curb appeal to a home or business.

B. Prior Art

There are many other prior art references to flower pots and flower pots that separate. A representative example of this can be found at Walker, U.S. Pat. No. 5,584,433, which is a flower pot that attaches in two sections.

Another example is Delzell, U.S. Pat. No. 5,579,295, which is also a detachable flower pot. However, this does not have a stand as contemplated in this device. Another flower pot that can be detached rotates around a hinge and can be found at Byrne, U.S. Pat. No. 436,565.

In addition to those representative examples, there is also a mailbox flower pot holder that can be found at Enalfarb, Pat. No. D348,633. In this reference, the flower pot area does not completely cover the area around the post or column.

BRIEF SUMMARY OF THE INVENTION

This is a decorative flower pot that comes in two sections, which are detachable and semicircular. Each section provides a predetermined space in which flowers can be planted. The sections of the pot can come in different sizes and adapters to conform to different sized columns or posts are also contemplated.

Although a circular pot will be discussed in this application there are many other shapes of pots that may be used such as square pots, rectangular pots or pots that are tapered.

Each section will be semicircular in shape and will have an opening in the middle when both sections are attached. The column or post will fit within this opening. Between the cut out portions of each section and the outside perimeter of each section will be an area in which soil and plants can be placed.

On the bottom of each of the sections a plurality of drain holes or mechanisms to drain each of the sections will be provided. Many columns on homes are made from wood, which can be damaged by constant exposure to water. Each of the sections will rest on a stand that will elevate the sections above the ground level.

Tubing on the bottoms of each of the section is provided to drain the sections while at the same time directing the water away from the wooden columns of the residence or building to prevent damage to the wood and prevent the pooling of water.

The stand that is provided is hollow and will elevate the flower pot so there is separation between the floor or ground surface and the wood column of a house.

The sections are detachable and can be easily cleaned and reattached. There are many ways to attach the two sections, including snaps on either side as well as tabs that slip into slots.

It is contemplated that decorative ornaments may be added to the outside of the sections in order to conform to the wishes or particular tastes of the homeowner.

NUMBERING REFERENCE

Figure 1:
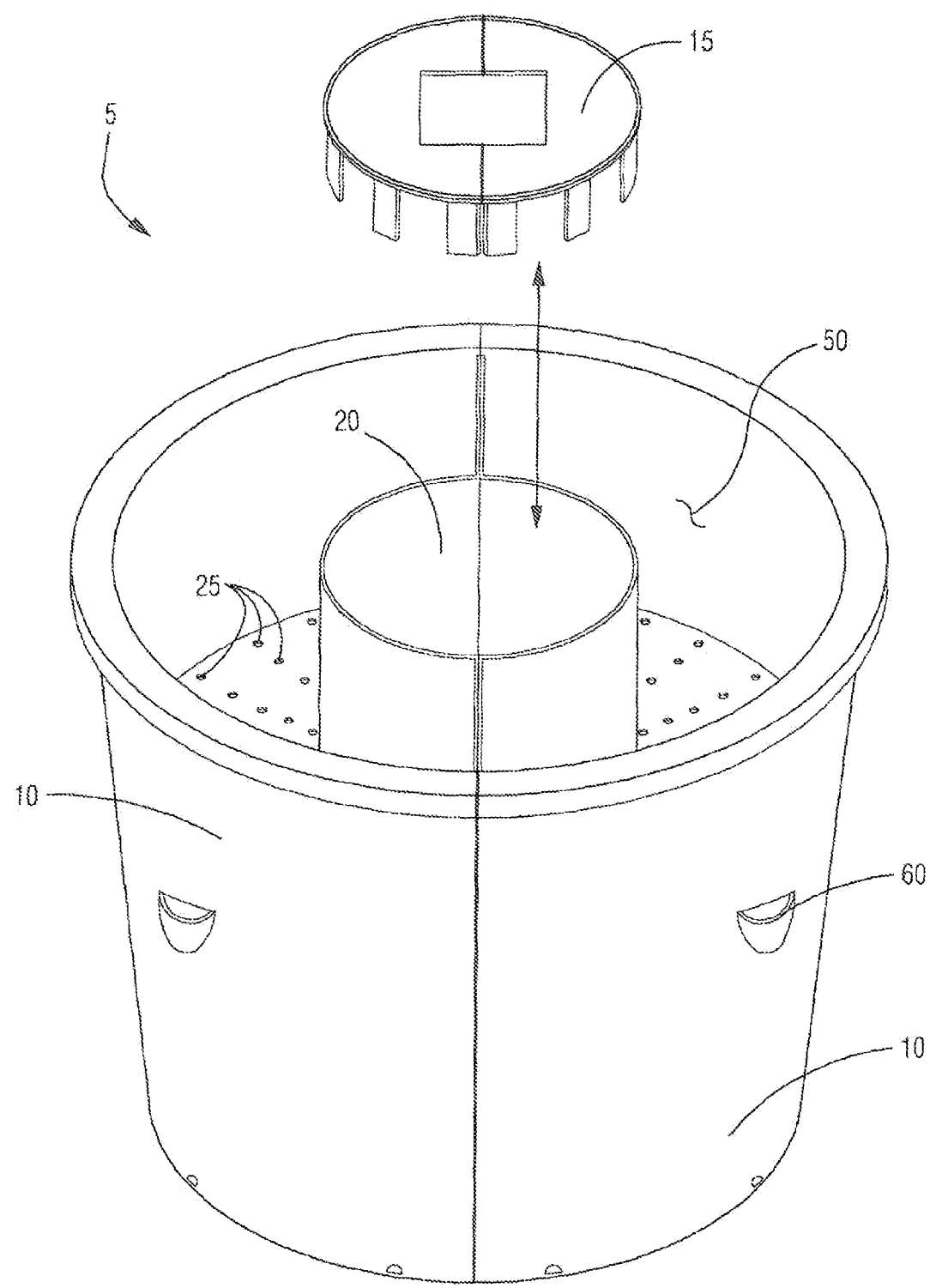
FIG. 1 is an isometric view of the device with the adapter shown above the opening of device.
Figure 2:
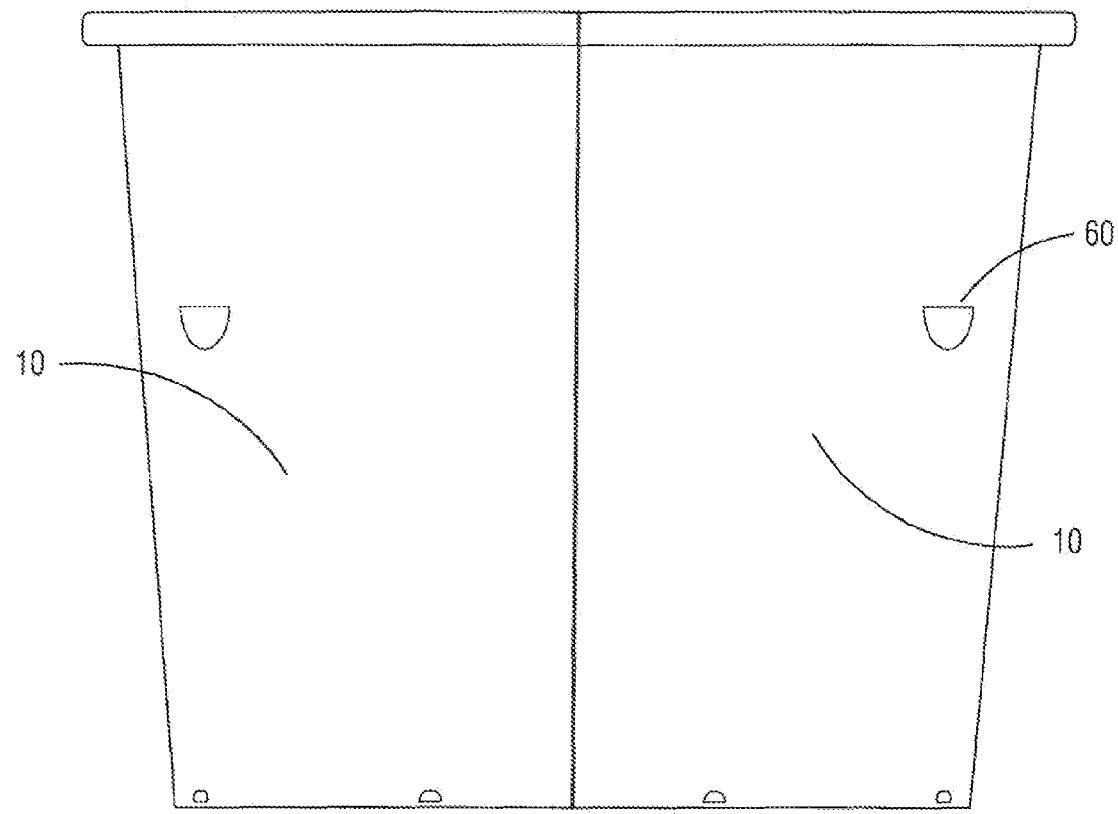
FIG. 2 is a side view of the device.
Figure 3:
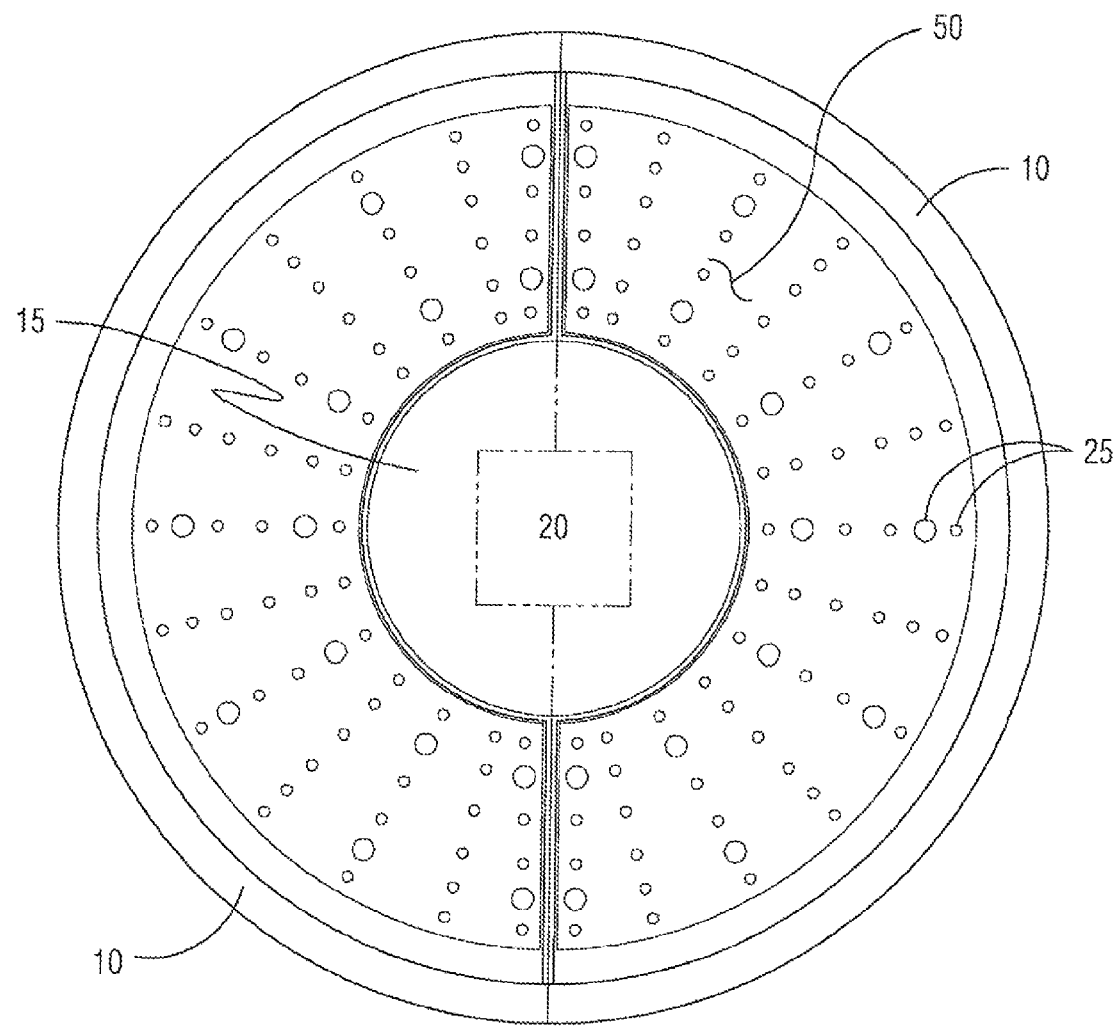
FIG. 3 is a top view of the device.

5—Device
10—Section
15—Adapter
20—Opening
25—Drain Holes
30—Support Column
31—Bottom surface
32—Top Surface
33—Overflow opening
35—Drainage Means
36—Drainage opening
37—Cavity
40—Female Connection Means
45—Male Connection Means
50—Soil and Flower area
55—Beveled Edge
60—Outside opening

DETAILED DESCRIPTION OF THE EMBODIMENTS

This device 5, which is a sectional detachable flower pot, will allow the homeowner or business owner the opportunity to place decorative pots around existing columns or posts. For instance, in the case of a homeowner who has a porch, there are columns that support the porch. Usually the homeowner hangs the plant from a hook that is secured to the top of the porch and the pot hangs down or the homeowner buys a pot that is semi-circular and this is placed on the ground surface near the base of the post.

Although semi-circular sections will be discussed other shapes of pots are also contemplated. Regardless of the shape of the pot the key feature will be a detachable pot that can be placed around the column or post of a business or home to add a decorative touch to the home or business. These designs may include square or rectangular designs and may also include pots that are tapered from top to bottom or vice versa.

With this device the homeowner can place this device around the post and attach the sections so that the device completely encircles the post. Each of the sections will be semi-circular in shape with a cut-out portion in each section. When the two sections 10 are joined together each of the cut-out portions will join together to form an opening 20 in the center.

A predetermined soil and flower area 50 is located away from the opening will be provided. The soil and plants will rest on a top surface 32 that contains a plurality of drain holes 25. Beneath this top surface will be a cavity 37 that has a bottom surface 31 that is solid and will allow any excess water to pool to prevent damage to the plant due to overexposure to water.

Support columns 30 are placed between the bottom surface 31 and the top surface to form the cavity 37 and support the weight of the soil and plants.

Figure 6:
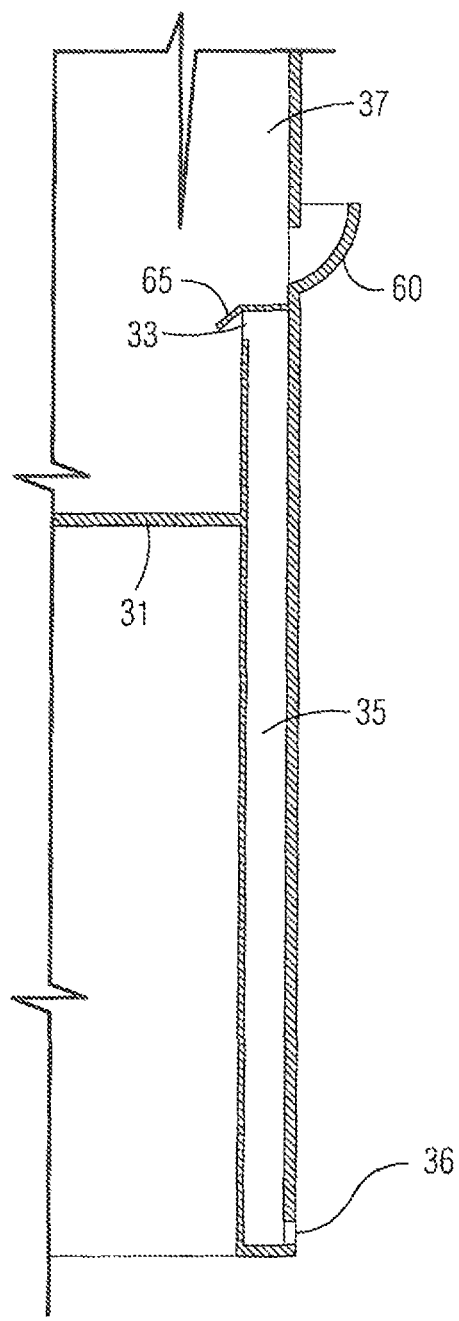
FIG. 6 is a cross-sectional view of the drainage means as depicted by line 6 on FIG. 4.

As shown in FIG. 6 as the water drains through the plurality of holes on the top surface it will be captured in the cavity 37. When the water reaches a certain level in the cavity 37, it will rise above the level of the overflow opening 33 and drain through the drainage opening 35, which is open at the bottom 36 to permit drainage away from any possible wood structure of the home or business.

The two semi-circular sections 10 will attach together. As depicted on FIG. 4 a female connection means 40 and a male connection means 45 are used. The connection means 40, 45 are placed on the outside perimeter of the two sections. Although the connection means are depicted on the outside perimeter other means of connection, including a way to connect the sections on the interior of the sections may be used. Regardless of the specific means of connection the means must be able to securely join the two sections 10 together.

Because not all posts are the same diameter or shape and adapter 15 will be provided. The adapter will be inserted into the opening 20 that is formed when the two sections 10 are joined together. The adapter 15 will be used if the post is a different diameter or if the post is square or slightly rectangular.

Figure 4:
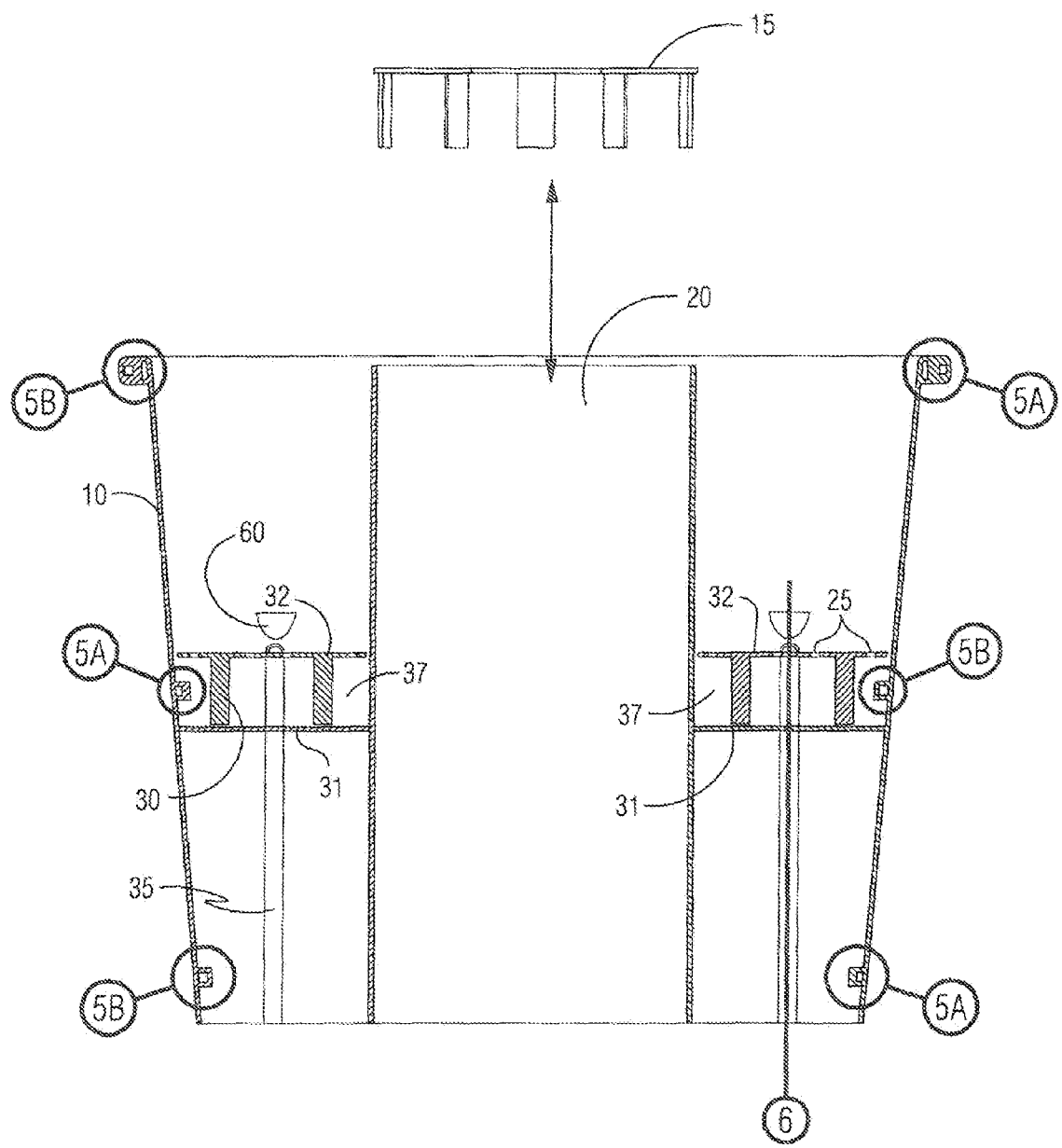
FIG. 4 is a cross sectional view of the device.
Figure 5A:
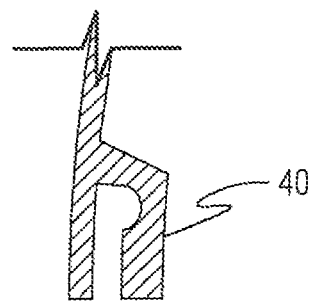
FIG. 5A is a cross-sectional view of the female connection means.
Figure 5B:
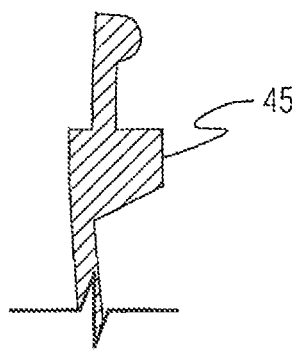
FIG. 5B is a cross-sectional view of the male connection means.

On the top surface of the soil and flower area 50 will be a plurality of drain holes 25 that will permit the water to drain into the cavity 37 that is formed by the top and bottom surfaces. The portion of the device where the soil and plants are placed in the respective sections is slightly elevated above the ground level as depicted by FIG. 4. Because the soil and plants are placed above the ground level, it will allow the device to drain away from the wooden posts through the drainage means 35.

The drainage means 35 may be flexible so that the consumer to direct the flow of water away from the base of the wooden posts.

A plurality of outside openings 60 will be placed on the outside perimeter of the pot. These outside openings 60 will help to insure that some water will be in the cavity 37 to insure that water will always be in the device. Additionally if nutrients needed to be added to the water the outside openings will provide a means to accomplish that result.

In order to insure that the water and/or nutrients that may be added through the outside openings does not simply go through the drain a beveled edge 55 has been placed on the interior surface of the device above the drainage means to prevent that occurrence. It may be desirable to add nutrients into the cavity rather than directly on the plants.

Because this will be used in or around the home it will be made in several different colors to be attractive to the homeowner and lend additional curb appeal to the home.

From the curb to the home the person would see the device fully encircling a post without noticing that the portion of the device with the plant is actually above the ground level and is permitted to drain.

Additionally because this device will be used around the home many different materials may be used to construct this device. Regardless of the material the choice of material must be determined based on the extreme weather conditions that may occur in a particular area.

While the embodiments of the invention have been disclosed, certain modifications may be made by those skilled in the art to modify the invention without departing from the spirit of the invention.

The inventor claims:

1. A sectional detachable flower pot comprising:
    a. two similarly shaped sections;
        wherein each of the two similarly shaped sections has a side wall, a top surface and a bottom surface;
        wherein a plurality of support columns are provided between the similarly shaped sections and contacting each of the top and bottom surfaces;
        a cavity is disposed proximate the middle of the sidewalls of the similarly shaped sections;
        a plurality of inner overflow openings in the cavity adjacent or near the top surface;
        a beveled edge at least partially covering the overflow openings;
        a plurality of drainage holes directly connected to the respective inner overflow openings;
        the plurality of drainage holes is provided below an area for the soil and plants;
        said plurality of drainage holes is provided on a flat surface on the bottom surface;
        said flat surface is formed as an integral part of the pot;
    b. the cavity;
        wherein the cavity is formed below the area for the soil and plants;
        said cavity has a top surface with a plurality of holes;
        said cavity has a solid bottom surface;
    c. the plurality of support columns;
        wherein the plurality of support columns is provided between the top surface and the bottom surface that forms the cavity;
    d. a drainage means for connecting the overflow openings to the drainage holes,
        an adapter having portions within each of the two similarly shaped sections.

2. The device as described in claim 1 wherein the drainage means is flexible.

3. The device as described in claim 1 wherein the adapter accommodates a square post.

4. The device as described in claim 1 wherein a means of connection is placed on the inner perimeter of the two sections.

5. The device as described in claim 1 wherein a means of connection is placed on the outside perimeter of the two sections.

* * * * *